United States Patent [19]

Takakura

[11] Patent Number: 5,473,479

[45] Date of Patent: * Dec. 5, 1995

[54] DIGITAL RECORDING AND/OR REPRODUCTION APPARATUS OF VIDEO SIGNAL REARRANGING COMPONENTS WITHIN A FIXED LENGTH BLOCK

[75] Inventor: Eiichi Takakura, Nagareyama, Japan

[73] Assignee: Sharp Kabushiki Kaisha, Osaka, Japan

[*] Notice: The portion of the term of this patent subsequent to May 3, 2011, has been disclaimed.

[21] Appl. No.: 236,131

[22] Filed: May 2, 1994

Related U.S. Application Data

[63] Continuation-in-part of Ser. No. 5,382, Jan. 15, 1993, Pat. No. 5,309,292.

[30] Foreign Application Priority Data

Jan. 17, 1992 [JP] Japan .................... 4-006301

[51] Int. Cl.⁶ ................. G11B 5/09; H04N 5/76
[52] U.S. Cl. ................. 360/48; 360/53; 360/32; 358/335
[58] Field of Search ................. 360/32, 48, 53; 358/135, 310, 335, 906, 909

[56] References Cited

U.S. PATENT DOCUMENTS

| | | | |
|---|---|---|---|
| 5,023,710 | 6/1991 | Kondo et al. | 358/133 |
| 5,073,821 | 12/1991 | Juri | 358/135 |
| 5,173,773 | 12/1991 | Ueda et al. | 358/135 |
| 5,175,631 | 12/1991 | Juri et al. | 358/310 |
| 5,309,292 | 5/1994 | Takakura | 360/48 |
| 5,351,131 | 9/1994 | Nishino et al. | 360/48 |

FOREIGN PATENT DOCUMENTS

| | | |
|---|---|---|
| 0471118 | 2/1992 | European Pat. Off. . |
| 0559467 | 9/1993 | European Pat. Off. . |
| 2-220270 | 9/1990 | Japan . |

OTHER PUBLICATIONS

IEEE Transactions on Consumer Electronics, vol. 37, No. 3, Aug. 1991. New York US pp. 261–266—C. Yamamitysu & Al. 'A study on trick plays for digital VCR'.

*Primary Examiner*—Aristotelis Psitos
*Assistant Examiner*—W. Chris Kim

[57] ABSTRACT

In a digital VTR that carries out magnetic recording and reproduction by bit rate reduction coding a digital video signal, a fixed length block is formed by controlling the code amount of a large block including a plurality of small blocks located distant from each other on a screen at the time of recording. The fixed length block is divided into a plurality of recording blocks so that the main components of respective small blocks are included separately on the recording blocks. The recording blocks are rearranged so that recording blocks including the main components of small blocks adjacent on a screen are also adjacent on a recording medium. Thus, the possibility of deviation in the information amount of each large block is suppressed to improve efficiency of bit rate reduction coding, and to obtain a high speed reproduced picture of high quality.

17 Claims, 8 Drawing Sheets

DIGITAL RECORDING AND/OR REPRODUCTION APPARATUS OF VIDEO SIGNAL REARRANGING COMPONENTS WITHIN A FIXED LENGTH BLOCK

This application is a continuation-in-part of application Ser. No. 08/005,382 filed on Jan. 15, 1993 U.S. Pat. No. 5,309,272, the entire contents of which are hereby incorporated by reference.

BACKGROUND OF THE INVENTION

1. Field of the Invention

The present invention relates to a digital recording and/or reproduction apparatus of a video signal, and more particularly, to a recording apparatus for carrying out bit rate reduction coding of a video signal and digitally recording the coded video signal on a recording medium, a reproduction apparatus for digitally reproducing a video signal at a changeable speed from a recording medium having such video signal recorded thereon, and a recording/reproduction apparatus having such digital recording and reproduction function.

2. Description of the Background Art

In recent years, an apparatus has been developed for recording digitally a video signal on a recording medium and reproducing digitally the same from the recording medium. One such typical apparatus is the so-called digital video tape recorder (referred to as "digital VTR" hereinafter) which is available for practical use. In such a conventional digital VTR, a digital video signal which is in a bit rate reduction coded (bandwidth compressed) state for the purpose of reducing the enormous amount of information to a level suitable for recording and reproduction is recorded on a magnetic tape and reproduced therefrom using a rotary head.

There are two methods of such bit rate reduction coding, that is, one method of merely controlling the code amount of video information constituting the entire screen, and another method of dividing the entire screen into a plurality of blocks and controlling the code amount so that the video information constituting each block has a fixed length. As will be described afterwards, the latter method is suitable as a bit rate reduction coding method for a digital VTR having reproduction function at a changeable speed.

FIG. 1 is a block diagram schematically showing a structure of a conventional digital VTR using the above mentioned latter bit rate reduction coding method. FIG. 2 schematically shows the manner of dividing screen into blocks according to such a bit rate reduction coding method. FIG. 3 schematically shows the data arrangement in tracks on a tape. Such a conventional digital VTR is disclosed in Japanese Patent Laying-Open No. 2-220270, for example.

Referring to FIG. 1, at the time of recording, a digital video signal provided from a video signal source not shown is supplied to a block shuffling circuit 101 included in a digital VTR. Block shuffling circuit 101 divides the digital video signal into blocks each having a certain size to rearrange the video signal data on the basis of such block.

More specifically, referring to FIG. 2, the entire rectangular represents one whole screen. The entire screen is divided into six regions of A, B, C, D, E and F. Each region is further divided into small rectangular units (small blocks), where small blocks in each region are indicated by numbers such as 1, 2, 3, . . . . For example, region A is formed of a plurality of small blocks of A1, A2, A3, . . . , and region B is formed of the same number of small blocks of B1, B2, B3, . . . . The same can be said for the remaining regions C, D, E and F.

Block shuffling circuit 101 divides the supplied digital video signal constituting an entire screen into the above-described rectangular units (small blocks). Then, the digital video signal is rearranged on a small block basis in such arrangement that small blocks are sequentially derived one by one from respective regions of A–F in ascending order, such as A1, B1, C1, D1, E1, F1, A2, B2, C2, D2, E2, F2, A3, . . . . Each group of small blocks of a corresponding number read out from the respective six regions A–F, for example a group of (A1, B1, C1, D1, E1, F1), a group of (A2, B2, C2, D2, E2, F2) . . . , is defined as one "large block".

The digital video signal rearranged as described above is applied to a bit rate reduction coding circuit 102 where bit rate reduction coding of data on the basis of the above-described large block is carried out to realize an amount of information suitable for recording onto a tape. More specifically, a video signal of each small block entered into bit rate reduction coding circuit 102 is subjected to the well-known orthogonal transform coding, and then subjected to a variable length coding process according to the information amount of each small block so that the coded amount of a large block becomes constant. As a result, reduction of the data amount, i.e. bit rate reduction coding is realized. The data of the plurality of small blocks constituting each large block are gathered together to be provided as a block data of a fixed length to be supplied to an error correction coding circuit 103.

Error correction coding circuit 103 adds an error correction code (parity) to the block data of a fixed length subjected to bit rate reduction coding, which is supplied to a synchronizing signal-ID signal applying circuit 104. Synchronizing signal-ID signal applying circuit 104 adds a synchronizing signal and an ID signal to the supplied video signal to provide the same to a modulation circuit 105.

Modulation circuit 105 modulates the supplied signal while suppressing the direct current (DC) component thereof to record the same on the above-described fixed length block basis on a magnetic tape 107 as a recording medium via a magnetic head 106. FIG. 3 shows the recording manner on such a tape. Each track is constituted by a plurality of block data of a fixed length M1, M2, M3, M4, . . . .

At the time of reproduction, recorded data M1, M2, M3, . . . on tape 107 such as that shown in FIG. 3 are reproduced via a magnetic head 108 to be demodulated by a demodulation circuit 109. The demodulated video signal is supplied to a synchronizing signal-ID signal detection circuit 110 where detection of a synchronizing signal and an ID signal is carried out. Then, the video signal is applied to an error correction decoding circuit 111.

Error correction decoding circuit 111 carries out error correction to the applied video signal, and variable length decoding and inverse orthogonal transform process for data of each of small blocks forming the fixed length block to restore the original data of each small block. The restored data is supplied to a decoding-concealment circuit 112 where decoding and concealment of a video signal are carried out for the portion of data where error correction could not be carried out in error correction decoding circuit 111.

The data subjected to an error correction and decoding process is supplied to a block de-shuffling circuit 113 where a inverse rearrangement of the rearrangement by block shuffling circuit 101 of the recording system is carried out.

As a result, the video signal of the original data arrangement at the time of recording is reproduced. The data signal of block de-shuffling circuit 113 is output appropriately to be provided to a monitor device and the like not shown.

In a conventional digital VTR shown in FIGS. 1–3, a plurality of small blocks that are located distance from each other on a screen (for example, A1, B1, C1, D1, E1, F1) are gathered together to form a large block, and control of the code amount is carried out on the basis of this large block to form a data block of a fixed length (for example M1) to be recorded on a tape. Therefore, corresponding small blocks (for example A1 and A2, B1 and B2) of two data of fixed length recorded adjacent to each other on a tape (for example M1 and M2) are the small blocks adjacent to each other on the screen. The deviation of the amount of information of video data is considered to be necessarily small between two adjacent small blocks on the screen. Therefore, deviation in each information amount of fixed length data (M1, M2, . . . ) recorded adjacent to each other on a tape is less likely to occur, so that the video signal can be transmitted with the desired quality of picture, that is, efficiency of bit rate reduction coding can be improved.

More specifically, it is necessary to allocate the code amount according to the information amount of a picture in order to code the video data while maintaining the desired picture quality. On the other hand, it is also required to make the code amount after coding constant in each large block. As a result, if the deviation in the information amount of each large block is large, the data of a large block having such large information amount is discarded and it becomes difficult to maintain sufficient picture quality. If the code length of the fixed length block is made large to correspond to that of the block having the largest amount of information in order to maintain sufficient picture quality, on the other hand, the code length of the large block having a smaller amount of information is also increased unnecessarily and it becomes difficult to carry out bit rate reduction coding with the improved efficiency. Accordingly, in the conventional digital VTR, the deviation in the information amount of each fixed length block was made small in the above described manner to carry out bit rate reduction coding with the improved efficiency.

In addition, when the video data is recorded on the basis of small block constituted by a plurality of pixels and such recorded data is reproduced at a high speed, small blocks belonging to different fields (frames) are usually reproduced adjacent to each other on the same screen and a boundary between such small blocks can be visually recognized in such a case. If a large number of small blocks belonging to different fields (frames) are reproduced in the minutely mixed manner, such boundaries are also generated minutely, resulting in the reproduced picture which appears as if a mosaic pattern processing has been applied.

Therefore, by maintaining continuity of data on a screen between fixed length blocks (for example M1 and M2) recorded adjacent to each other on a tape, data continuity on a screen can be ensured even at the time of high speed reproduction such as in high speed search mode to prevent a mosaic pattern appearing on a screen, whereby good visual quality of the reproduced picture can be ensured.

The manner of block division of a screen in the above-described conventional VTR had a problem set forth in the following. From the standpoint of further improving the efficiency of bit rate reduction coding, it is preferable to divide the entire screen into as many regions as possible to increase the number of small blocks included in each large block (fixed length block) to suppress deviation in the information amount of each fixed length block data. However, from the standpoint of ensuring good visual quality of the reproduced picture at the time of high speed reproduction, it is preferable to reduce the number of small blocks included in each large block (fixed length block) to ensure continuity of data on a screen for preventing mosaic deformation on the screen.

As shown in FIG. 2, for example, small blocks are derived one by one from the respective six regions A–F to form one large block (M1=A1, B1, C1, D1, E1, F1), and code amount control is carried out for making the code amount for each large block constant to form a fixed length block. Then, recording onto a tape is carried out on the basis of this fixed length block (M1, M2, M3, M4, . . . ). If it is adapted that adjacent small blocks on a screen (for example, A1 and A2) are the two small blocks corresponding to each other in the two adjacent fixed length blocks (for example M1 and M2) on the tape, only ⅙ (for example, 5 small blocks) of the small blocks (for example, 30 small blocks) that can be reproduced continuously from a tape at the time of high speed reproduction is successive in each of the regions A–F. As described in the foregoing, the mosaic deformation is usually caused by generation of a large number of boundaries among blocks belonging to different fields. In order to present such mosaic deformation, therefore, it is required that small blocks belonging to the same field is reproduced on the screen as many as possible. If only 5 small blocks, corresponding to ⅙ of 30 small blocks which can be continuously reproduced on the screen, can be continuously reproduced in each of the regions A–F as described above, however, a large number of boundaries among blocks belonging to different fields are generated on the screen and mosaic deformation at the time of high speed reproduction cannot be prevented sufficiently.

Conversely, if the screen is divided into a smaller number, for example divided into two, ½ of the small blocks that can be reproduced continuously from a tape at the time of high speed reproduction can be successive on each of the regions, whereby visual quality of the picture at the time of high speed reproduction can be improved to some degree. However, in this case, there is a possibility of deviation in the information amount of each fixed length block to degrade the efficiency of bit rate reduction coding.

Therefore, the design parameter of a digital VTR, particularly the number of small blocks included in each fixed length block can be determined only by a compromise between the efficiency of bit rate reduction coding and the visual quality of a high speed reproduced picture, resulting in a problem that the design of a digital VTR significantly lacks degree of flexibility.

SUMMARY OF THE INVENTION

An object of the present invention is to provide a digital recording and/or reproduction apparatus of a video signal having the efficiency of bit rate reduction coding of a video signal improved.

Another object of the present invention is to provide a digital recording and/or reproduction apparatus of a video signal having the picture quality of a reproduced picture at the time of high speed reproduction improved.

A further object of the present invention is to provide a digital recording and/or reproduction apparatus of a video signal promoting individually optimization of bit rate reduction coding and optimization of picture quality of high speed reproduction.

Briefly stated, an apparatus for recording digitally a digital video signal according to the present invention comprises a circuit for forming a plurality of small blocks each having a plurality of pixels in the horizontal direction and the vertical direction of the digital video signal, a circuit for forming a plurality of large blocks each having a plurality of small blocks located distant from each other on a screen, a circuit for coding the digital video signal for each of the small blocks constituting the large block, a circuit for controlling the code amount for each large block so that the total code amount of the plurality of small blocks constituting the large block is constant to form a fixed length block, a circuit for dividing the fixed length block into a plurality of recording blocks so that respective main components (important for decoding of video data) of the plurality of small blocks constituting the fixed length block are included separately in the plurality of recording blocks, a circuit for rearranging the plurality of recording blocks on the basis of the recording block, and a circuit for recording the rearranged plurality of recording blocks on the recording medium.

According to another aspect of the present invention, an apparatus for reproducing digitally a digital video signal recorded as described above comprises a circuit for detecting a plurality of recording blocks recorded on a recording medium, a circuit for rearranging the detected recording blocks on the basis of the recording block, a circuit for reconstructing a fixed length block from the plurality of recording blocks constituting a large block, a circuit for decoding a digital video signal for each of the plurality of small blocks constituting the reconstructed fixed length block, and a circuit for rearranging the plurality of small blocks constituting the fixed length block to restore pixels corresponding to the digital video signal at the time of recording.

According to a further aspect of the present invention, an apparatus for digital-recording a supplied digital video signal and for digital-reproducing a recorded digital video signal includes a circuit for forming a plurality of small blocks, each including a plurality of pixels in the horizontal direction and the vertical direction of the digital video signal, a circuit for forming a plurality of large blocks, each including a plurality of the small blocks located distant from each other on a screen, a circuit for coding a digital video signal for each of the small blocks constituting the large block, a circuit for controlling the code amount for each large block so that the total code amount of the plurality of small blocks constituting the large block is constant to form a fixed length block, a circuit for dividing the fixed length block into a plurality of recording blocks so that respective main components of the plurality of small blocks constituting the fixed length block are included separately in the plurality of recording blocks, a circuit for rearranging the plurality of recording blocks included in the plurality of error correction blocks on the basis of the recording block so that recording blocks including main components of small blocks adjacent to each other on a screen are also adjacent on a recording medium, a circuit for recording the rearranged plurality of recording blocks onto the recording medium, a circuit for detecting the plurality of recording blocks recorded on the recording medium, a circuit for rearranging the detected recording blocks on the basis of recording block, a circuit for reconstructing the fixed length block from the plurality of recording blocks constituting the large block, a circuit for decoding the digital video signal for each of the plurality of the small blocks constituting the rearranged fixed length block, a circuit for concealing the contents of each small block to reduce the effect of an error to a reproduced picture when error correction could not be carried out by the error correction circuit, and a circuit for rearranging the plurality of small blocks constituting the fixed length block to restore pixels corresponding to the digital video signal at the time of recording.

A main advantage of the present invention is to reduce the possibility of deviation in the information amount of each large block to improve the efficiency of bit rate reduction coding by controlling the code amount of the large block formed by a plurality of small blocks located distant from each other on a screen to form a fixed length block, dividing the fixed length block so that the main components of respective small blocks are included separately on recording blocks, and rearranging error correction blocks so that recording blocks including the main components of small blocks adjacent on the screen are also adjacent on the recording medium.

Another advantage of the present invention is to prevent mosaic deformation of a high speed reproduced picture to obtain a high speed reproduced picture of high visual quality, because the number of small blocks detected continuously on a track at the time of high speed reproduction are directly the number of small blocks successive on a screen.

A further advantage of the present invention is to allow arbitrary setting of design parameters to achieve a desired efficiency of bit rate reduction coding regardless of the picture quality of a high speed reproduced picture.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
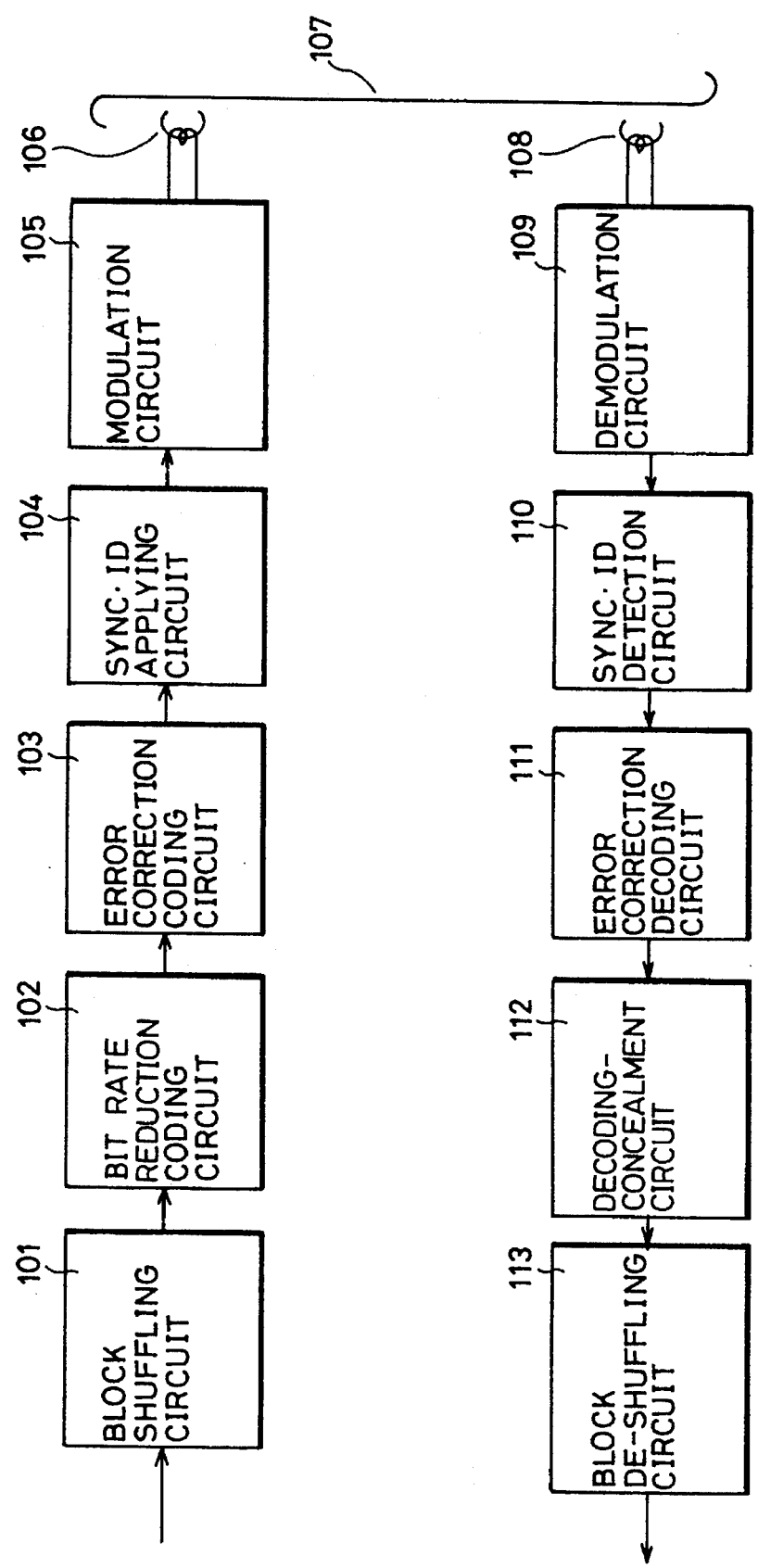
FIG. 1 is a block diagram schematically showing a structure of a conventional digital VTR.
Figure 2:
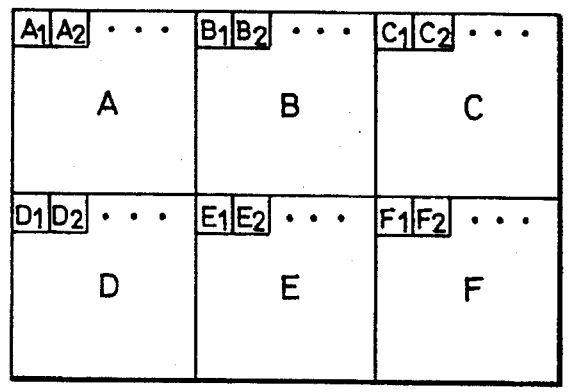
FIG. 2 schematically shows a manner of block division of a screen according to a bit rate reduction coding method.
Figure 3:
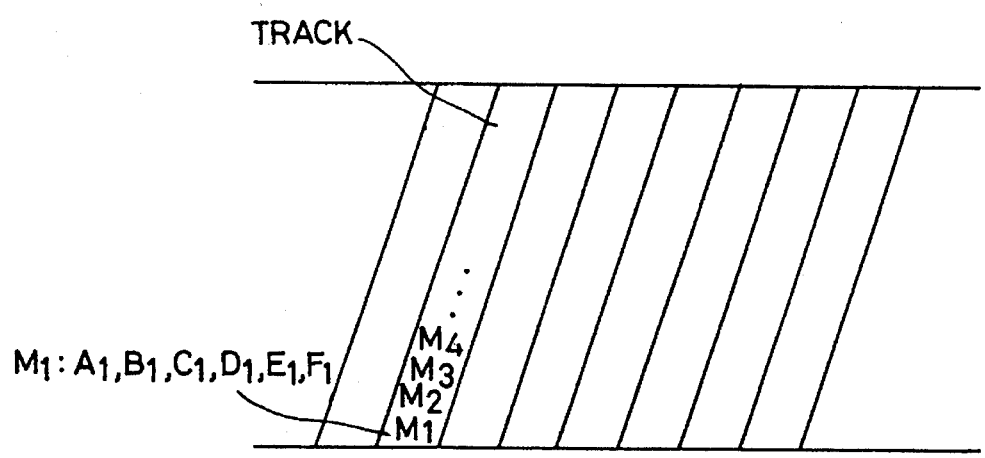
FIG. 3 schematically shows a data arrangement in a track formed on a tape by a conventional digital VTR.
Figure 4:
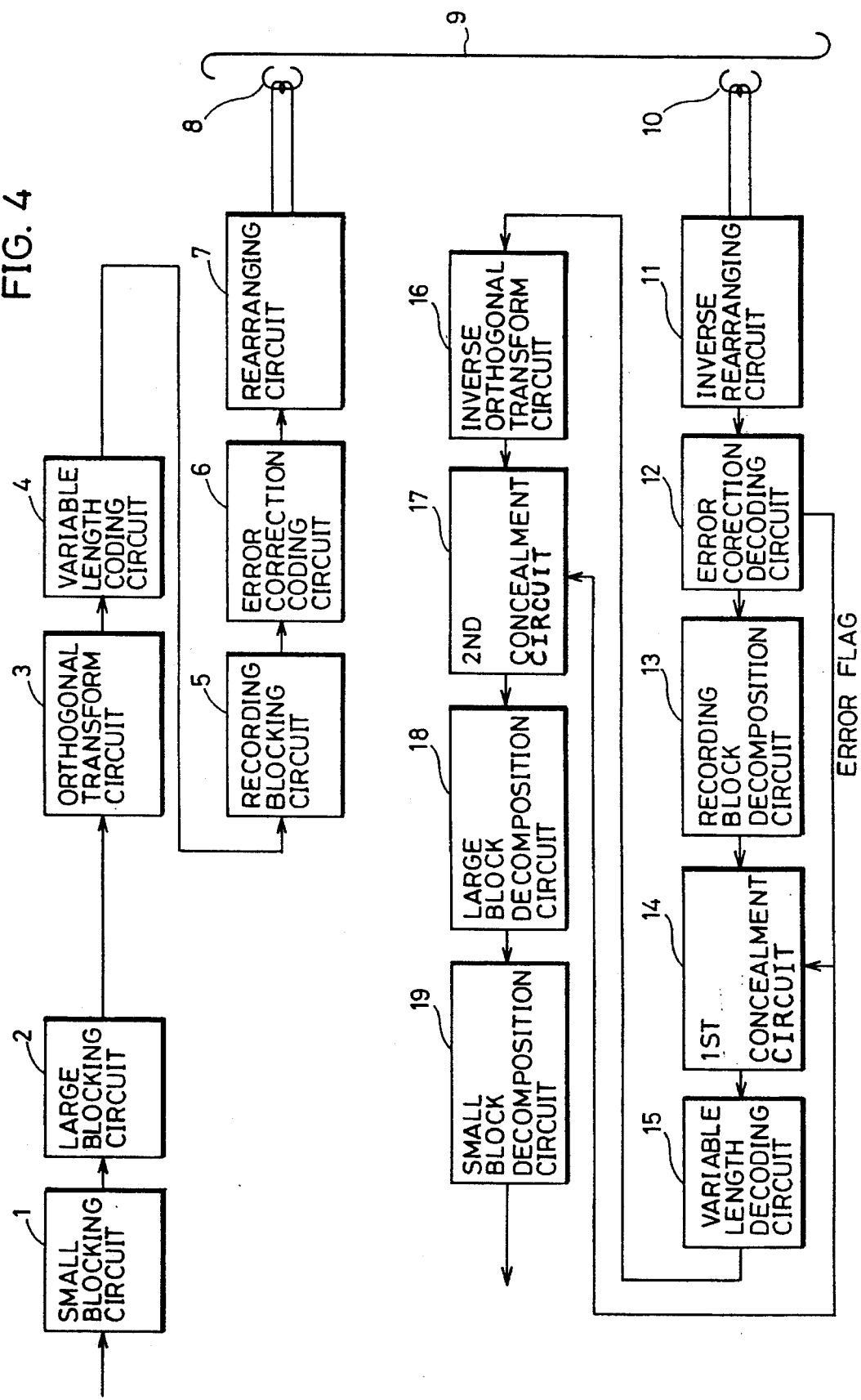
FIG. 4 is a block diagram schematically showing a structure of a digital VTR according to an embodiment of the present invention.
Figure 5:
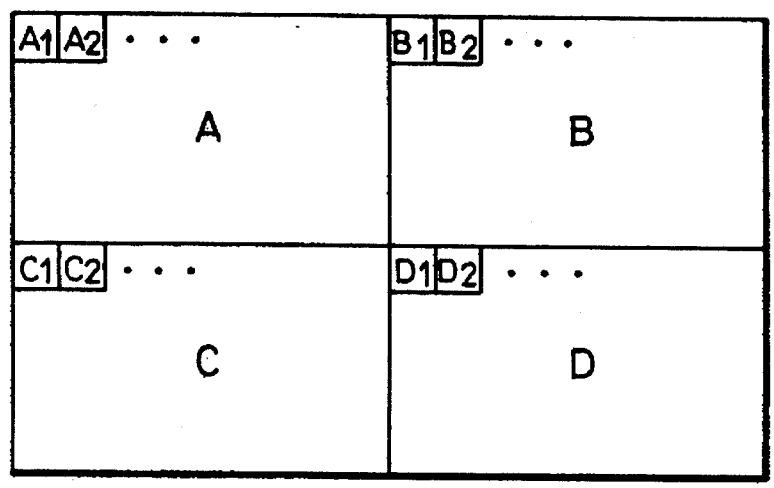
FIG. 5 is a diagram schematically showing a manner of block division of a screen according to an embodiment of the present invention.

FIG. 4 is a block diagram schematically showing a structure of a digital VTR according to an embodiment of the present invention. Referring to FIG. 4, at the time of recording, a digital video signal provided from a video signal source not shown is supplied to a small blocking circuit 1 included in a digital VTR. Similar to the case of conventional art described with reference to FIGS. 1–3, small blocking circuit 1 combines a plurality of pixels in the horizontal direction and the vertical direction of a digital video signal to form a plurality of rectangular units (small blocks of data) A1, A2, . . . , B1, B2, . . . , C1, C2, . . . , D1, D2, . . . , as shown in FIG. 5. The digital video signal rearranged in such a manner is supplied to a large blocking circuit 2.

Large blocking circuit 2 rearranges the digital video signal on the basis of small block by deriving in ascending order small blocks sequentially one by one from regions A, B, C and D obtained by dividing the entire screen into four as shown in FIG. 5, resulting in a plurality of large blocks (A1, B1, C1, D1), (A2, B2, C2, D2), . . . . The digital video signal rearranged in such a manner is supplied to an orthogonal transform circuit 3.

Orthogonal transform circuit 3 applies an orthogonal transform process to the entered digital video signal of each small block using a well known method such as discrete cosine conversion, and supplies the same to a variable length coding circuit 4. Variable length coding circuit 4 applies a variable length coding process for each small block according to the amount of information of each entered small block. Although the code amount of information of each small block is variable in the variable length coding process for each small block, variable length coding circuit 4 carries out control so that the total of the code length of the plurality of small blocks forming each large block is a fixed value, whereby a data block of a fixed length corresponding to each large block is obtained.

Figure 6:
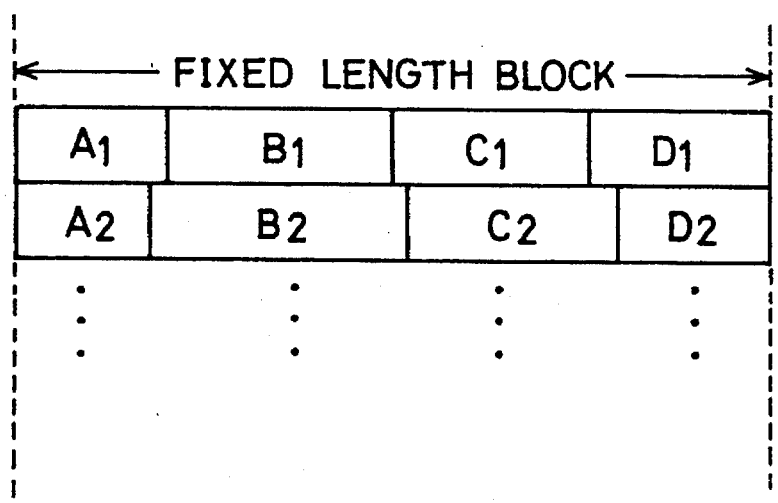
FIG. 6 schematically shows a structure of a fixed length block according to an embodiment of the present invention.

Describing more specifically the present embodiment with reference to FIG. 6, four small blocks of A1, B1, C1 and D1 constitute one large block (a fixed length block), and four small blocks A2, B2, C2, and D2 constitute another large block (a fixed length block). The same can be said for the remaining blocks. Variable length coding circuit 4 controls the code amount so that the total of the code amount of information in each large block is equal.

Similar to the case of the above-described conventional art, rearrangement of a digital video signal of the present invention results in small blocks (for example A1 and B1) in the same fixed length block being located apart from each other on a screen and corresponding small blocks (for example A1 and A2) in fixed length blocks recorded adjacent being located adjacent to each other on a screen. Therefore, the possibility of deviation in the information amount of each fixed length block is reduced. Similar to the case of the above-described conventional art, the effect of improving efficiency of variable length coding is ensured according to an embodiment of the present invention. In addition to an effect equal to that of conventional art, an embodiment of the present invention has the following novel feature.

A digital video signal subjected to variable length coding process as described above is supplied to a recording blocking circuit 5, whereby data division is carried out to form recording blocks which will be described afterwards. More specifically, the code of each block forming a fixed length block as shown in FIG. 6 includes additional information representing the code length after coding, followed by real information having video information from a low frequency component to a high frequency component after orthogonal transformation disposed sequentially from the low frequency component. The above-mentioned additional information and the real information of a low frequency component are called the main components of information among the information included in a fixed length block.

Recording blocking circuit 5 carries out data division of each fixed length block so that the abovementioned main components of the plurality of small blocks constituting the fixed length block are included in separate recording blocks. As such divisional methods, there are two methods, that is, a first method schematically shown in FIG. 7 and a second method schematically shown in FIG. 8.

Figure 7:
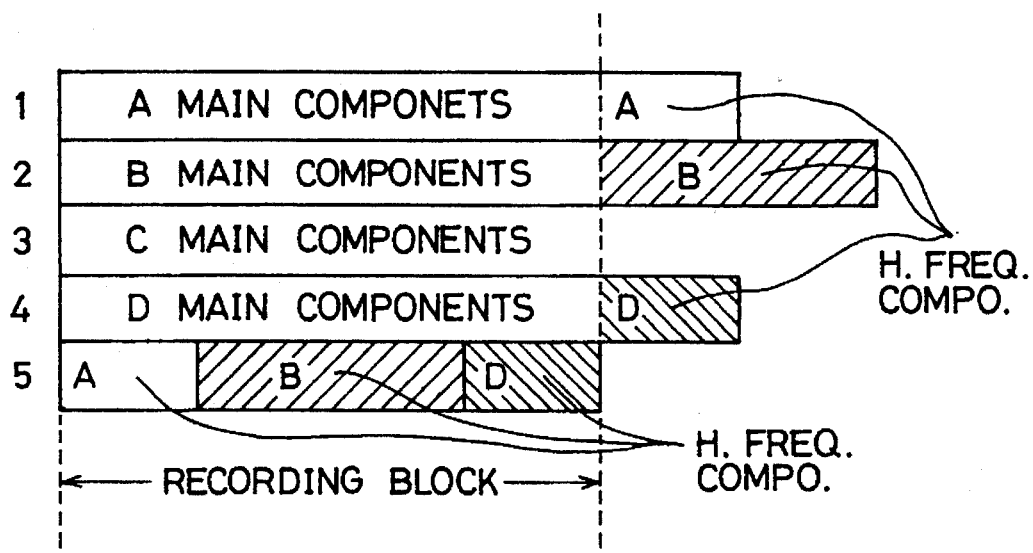
FIGS. 7 and 8 schematically show division methods of a fixed length block according to an embodiment of the present invention.

The first method shown in FIG. 7 will be described. FIG. 7 shows the case where one fixed length block is divided into recording blocks of 1–5. Form the information of small blocks A–D constituting one fixed length block, the main component information of respective small blocks are separately disposed into recording blocks 1–4, and components that are not so important and not included in the main components, such as high frequency information, are gathered from the respective four small blocks to be arranged in one additional recording block 5. Division of a fixed length block into recording blocks of 1–5 is carried out in such a manner.

Figure 8:
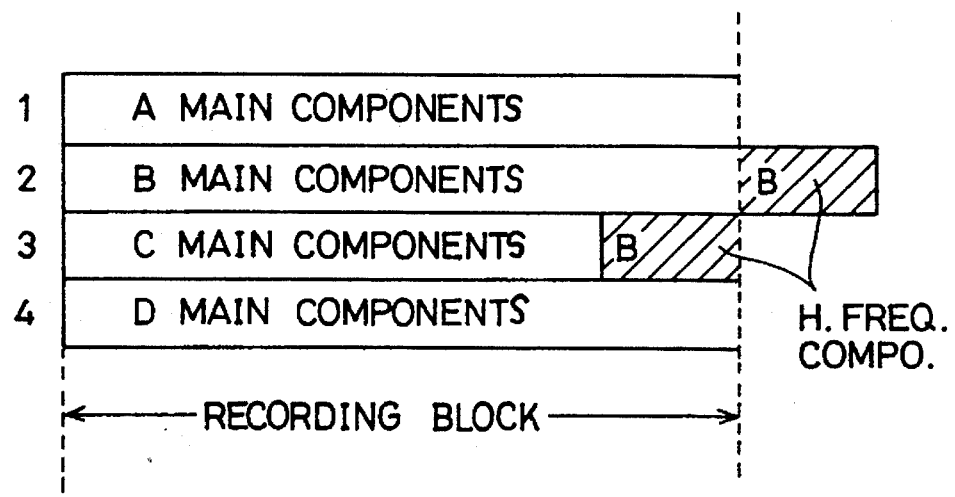

The second method shown in FIG. 8 will be described hereinafter. FIG. 8 shows the case where one fixed length block is divided into recording blocks of 1–4. More specifically, the average code length of small blocks A–D constituting one fixed length block is determined as the code length for each recording block, and information of respective small blocks A–D are disposed separately into recording blocks 1–4. The information, which could not be stored in the corresponding recording block, of a small block having a code length longer than the average value is stored into an empty region of another recording block where data of a small block having a code length shorter than the average value is stored. Division of a fixed length block into recording blocks 1–4 is carried out in such a manner.

By dividing a fixed length data so that the main components of information of a plurality of small blocks are arranged in separate recording blocks according to the above-described first and second methods, whereby any of the recording blocks 1–4 can be detected by a reproduction system of a digital VTR as will be described in detail afterwards, the video signal of a small block included therein can be restored without great degradation of picture quality.

The first method of FIG. 7 is characterized in that the main components of respective small blocks can readily be divided into separate recording blocks, and that only the information required for high speed reproduction can be reliably detected because the main components of a video signal are recorded in one group. The second method of FIG. 8 is characterized in that the main components of respective small blocks can readily be divided into separate recording blocks and that every recording block necessarily includes the main components of the corresponding small block so that one small block can be surely reproduced if one recording block can be reproduced at the time of high speed reproduction.

Although the objects of the present invention can be achieved by either of the above-described first or second method, the second method of FIG. 8 is employed in the following example for simplification of the description.

The video signal provided from recording blocking circuit 5 is supplied to error correction coding circuit 6 where an error correction code (parity) is added for correcting an error to be generated in a reproduction system. More specifically, the error correction coding process is carried out using the well known Read-Solomon product codes of outer codes and inner code, resulting in a plurality of error correction blocks. In each error correction block, the above-described recording blocks are stored in one-to-one correspondence with inner codes.

Figure 9A:
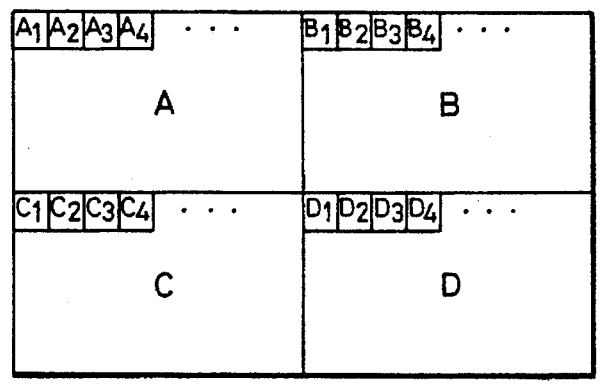
FIGS. 9A–9C schematically show data arrangement when four error correction blocks are formed according to an embodiment of the present invention.
Figure 9B:
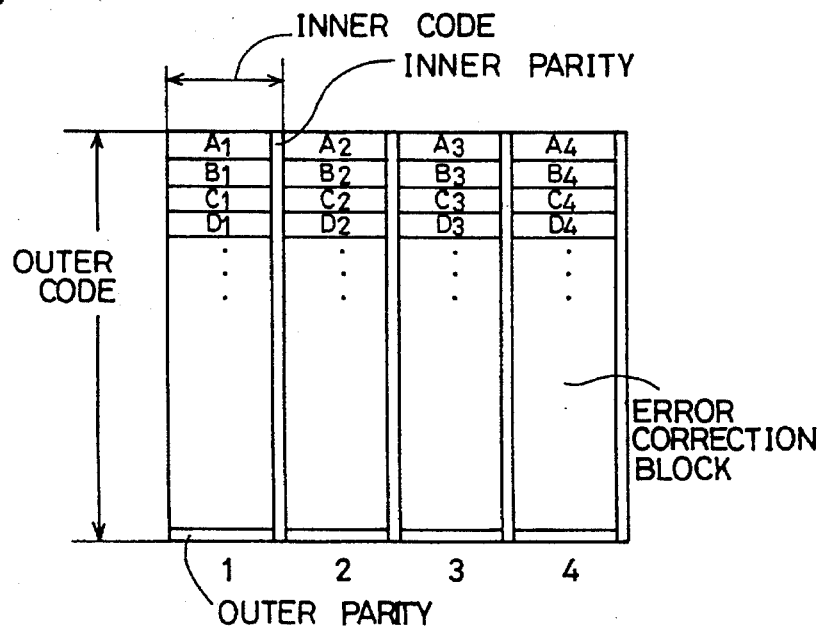
Figure 9C:
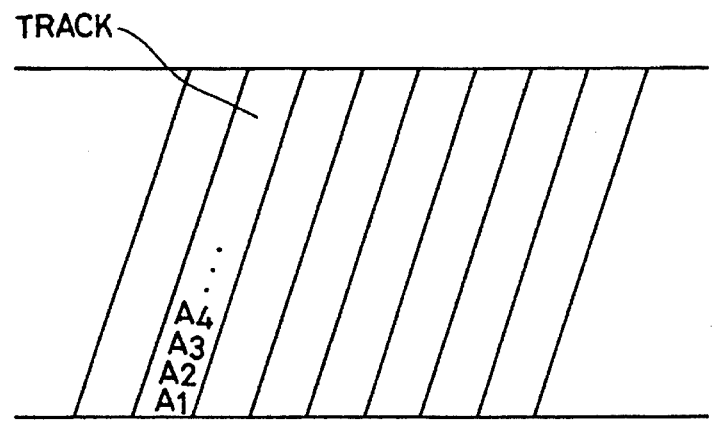

FIGS. 9A–9C schematically show the data arrangement in case of forming 4 error correction blocks according to the present invention. More specifically, FIG. 9A corresponds to the divided screen of FIG. 5 where the recording blocks corresponding to small blocks of A1, A2, A3, A4, . . . , B1, B2, B3, B4, . . . , C1, C2, C3, C4, . . . , D1, D2, D3, D4, . . . on a screen are sequentially stored in error correction blocks of the corresponding numbers, as shown in FIG. 9B. For example, recording blocks of A1, B1, C1, D1, . . . are stored in the first error correction block as the outer code with the outer parity added, and A2, B2, C2, D2, . . . are stored in the second error correction block as the outer code with the outer parity added. The remaining recording blocks are sequentially stored in the corresponding error correction blocks in a similar manner.

Recording blocks subjected to an error correction coding process which are arranged as shown in FIG. 9B are supplied to a rearranging circuit 7. Rearranging circuit 7 rearranges the recording blocks arranged as shown in FIG. 9B as that shown in FIG. 9C where small blocks adjacent on a screen (for example A1, A2, A3, A4, . . . ) are also adjacent on a track when recorded on a tape.

Recording blocks rearranged in such a manner are modulated by a modulation circuit not shown to be recorded on a magnetic tape 9 via a magnetic head 8.

Thus, inner codes corresponding to respective adjacent small blocks on a screen (for example A1 and A2 in FIG. 9A) are included in a distributed manner in separate error correction blocks (for example, in the first and second error correction blocks of FIG. 9B). Furthermore, small blocks adjacent on a screen (A1 and A2) have data rearranged so as to be adjacent even on the recording track as shown in FIG. 9C. Therefore, at the time of reproduction, inner codes are sequentially derived one by one from the four error correction blocks. As a result, when there is a burst error along the longitudinal direction of the track of FIG. 9C in the reproduction system, such a burst error is divided among the four error correction blocks. In comparison with the conventional data arrangement shown in FIG. 3, the data arrangement of the present invention as described-above provides an effect that the length of a burst error that can be corrected with outer codes is quadrupled. There is also an advantage of improving the visual quality of the picture at the time of high speed reproduction.

In the present embodiment, small blocks adjacent on a screen, for example A1, A2, A3, A4, . . . , are arranged into different error correction blocks 1, 2, 3, 4, whereby A1, A2, A3, A4, . . . are also read out sequentially from the different error correction blocks in a recording operation. Such a readout sequence from error correction blocks is required to arrange recording blocks to be also adjacent on the track, including main components of small blocks adjacent on the screen required for ensuring visual picture quality of an image in reproducing at a high speed.

The method of arranging recording blocks into error correction blocks is not limited to that of the above-described FIG. 9B wherein recording block such as A1, A2, A3, A4, . . . are arranged into error correction code blocks. There are various approaches of realizing the same arrangement on the tracks. For example, A1, A2, A3, A4, . . . may be arranged into error correction block 1, and (B1, B2, B3, B4, . . . ), (C1, C2, C3, C4, . . . ), (D1, D2, D3, D4, . . . ) may be arranged into error correction blocks 2, 3, 4 in FIG. 9B, respectively. In this modification, recording blocks arranged into one error correction block are recorded on the same track. As a result, since burst error generated in the direction of the track cannot be distributed into respective error correction blocks, the error correction ability with respect to burst error is degraded. However, the visual picture quality of an image in a high speed reproduction operation is equal to the above embodiment. Thus, visual picture quality of an image in a high-speed reproduction mode does not directly depend on the structure of an error correction block.

The above process of rearranging recording blocks through error correction blocks was described including the steps of arranging recording blocks shown in FIG. 7 or FIG. 8 into error correction blocks shown in FIG. 9B using recording blocking circuit 5 of FIG. 4 and generating predetermined outer code and inner code correction parities required for carrying out an error correction process in a reproduction operation. This rearranging process was described on the basis of the circuit structure shown in FIG. 4. There are several approaches in which the rearranging process may be carried out at different stages of the signal process. A modification will be described hereinafter. For the sake of simplifying the description, the error correction process parity allocated to each recording block (such as A1, . . . ) of FIG. 9B is defined as an inner code parity, and an error correction parity generated using each recording block (A1, B1, C1, D1, . . . ) in one error correction block such as error correction block 1 of FIG. 9B is defined as an outer code parity. Although the above defined parities will be used in the following description, it is to be noted that an inner code parity and an outer code parity generated with respect to a recording block may be opposite to those described above.

A recording block which is an output signal of recording blocking circuit 5 of FIG. 4 is once recorded into the error correction parity coding memory formed within error correction coding circuit 6, whereby an outer code parity is generated. In applying each recording block into the inner code parity generation circuit for generating an inner code parity, the recording blocks are read out from the memory on the basis of an order that realizes arrangement of recording blocks on track for improving visual picture quality in reproducing at a high speed as shown in FIG. 9C, whereby an inner code parity is allocated to each recording block to be output from error correction coding circuit 6 of FIG. 4. In this case, rearranging circuit 7 of FIG. 4 is not required since the rearranging process is carried out by error correction coding circuit 6. The visual picture quality of an image in reproduction at a high speed is equal to that of the above-described embodiment because arrangement of recording blocks on a track as shown in FIG. 9C can be carried out by this rearranging process.

At the time of reproduction, the small blocks A1, A2, A3, A4, . . . of recorded data on tape 9 shown in FIG. 9C are reproduced via a magnetic head 10, and demodulated by a demodulation circuit not shown. The demodulated video signal is supplied to an inverse rearranging circuit 11 where the plurality of the error correction blocks have the small blocks rearranged to the original arrangement shown in FIG. 9B.

The rearranged video signal from inverse rearranging circuit 11 is supplied to an error correction decoding circuit 12. Error correction decoding circuit 12 carries out error correction to the supplied video signal for correcting an error generated at the time of reproduction, whereby the original recording blocks are restored and supplied to a recording block decomposition circuit 13. Error correction decoding circuit 12 applies an error flag to a recording block (small block) that could not be corrected, and provides the same to recording block decomposition circuit 13.

Recording block decomposition circuit 13 decomposes the recording block formed as shown in FIG. 9B to rearrange data so that coded data is restored for each small block constituting a fixed length block shown in FIG. 6. The resulting data is supplied to a first concealment circuit 14.

If there is no error in the portion of a recording block, where the main components of the corresponding small block area included (the white are in FIGS. 7 and 8), and if there is an error in the portion of a recording block, where not-important components of the corresponding small block are included (the shaded area of FIGS. 7 and 8), first concealment circuit 14 replaces such not-important components with "0", for example, and cancels the error flag applied by error correction decoding circuit 12. If there is an error in the portion of a recording block, where the main components of the corresponding small block are included, first concealment circuit 14 generates an error flag which is supplied to a second concealment circuit 17 at the succeeding stage.

A video signal subjected to the above-described correction process by first concealment circuit 14 is applied to a variable length decoding circuit 15. Variable length decoding circuit 15 applies a variable length decoding process of coded data for each small block to provide the same to a inverse orthogonal transform circuit 16. Inverse orthogonal transform circuit 16 applies an orthogonal transform process opposite to that at the time of recording to the data of each small block to obtain pixels for each small block.

Although the video signal of a small block having the non-important components replaced by "0" due to an error by first concealment circuit 14 has its high frequency components slightly lost, it is possible to obtain a reproduced picture having a picture quality of a certain level. If there is an error in the portion of the recording block, where the main components of the corresponding small block are included, and an error flag has been supplied to second concealment circuit 17 by first concealment circuit 14, the pixels of that small block are replaced by pixels of a small block at the same position of a preceding screen by second concealment circuit 17.

The pixels obtained for each small block are supplied to a large block decomposition circuit 18. Large block decomposition circuit 18 rearranges the small blocks as shown in FIG. 9A for reproduction on their respective positions on the screen. Small block decomposition circuit 19 decomposes the pixels of each small block to reproduce the arrangement of the digital video signal in the same manner as that of the digital video signal supplied to small blocking circuit 1 at the time of recording. The reproduced digital video signal is supplied to a monitor device not shown. Thus, display of a reproduced picture is possible.

Figure 10:
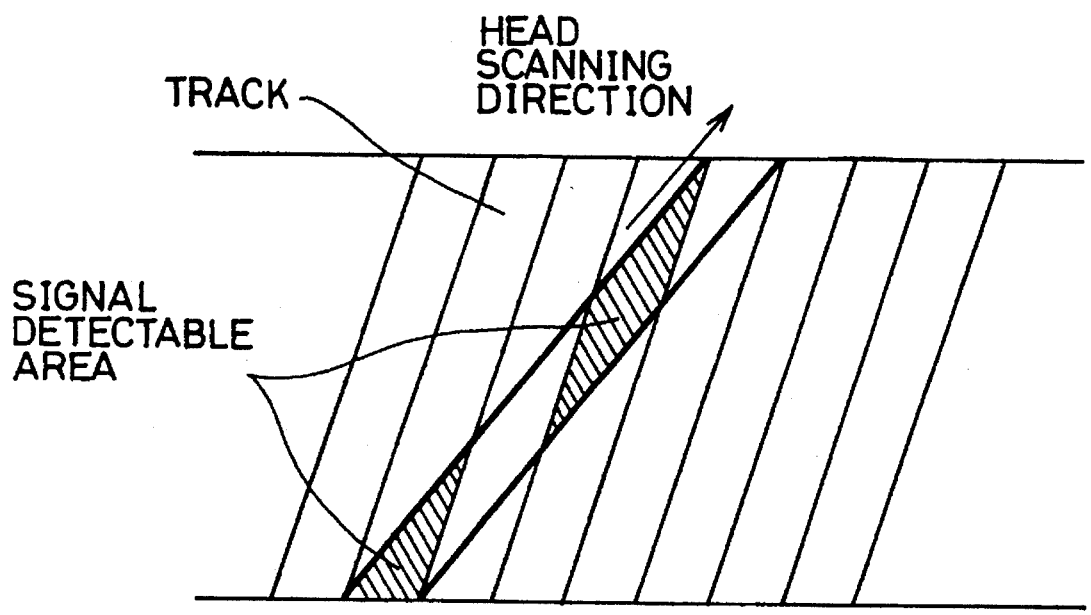
FIG. 10 schematically shows the relationship between record tracks formed on a tape by a digital VTR according to an embodiment of the present invention and a trace of a head at the time of high speed reproduction.

FIG. 10 schematically shows the relationship between record tracks formed on a tape by a digital VTR according to the above-described embodiment, and a trace of a head at the time of high speed reproduction. At the time of high speed reproduction, a head for reproduction traverses the plurality of record tracks formed on the tape for scanning. By employing an azimuth recording method, a video signal can be detected from every other track using one head, as shown by the shaded line in FIG. 10. According to the present embodiment of the invention, data of small blocks adjacent on a screen (for example, A1, A2, A3, A4, . . . ) are recorded successively on the basis of an inner code, as described in association with FIG. 9C, so that a signal can be detected with a certain continuity as such shown in FIG. 10 even at the time of high speed reproduction.

According to an embodiment of the present invention, inner codes adjacent on a record track have the main components of the small blocks located adjacent on a screen stored, as described in association with FIGS. 9A–9C, so that the number of inner codes that could be detected successively on the record track (the shaded region of FIG. 10) at the time of high speed reproduction is directly the number of small blocks continuous on the screen. As a result, mosaic deformation on a screen at the time of high speed reproduction can be prevented to obtain a picture of high visual picture quality at the time of high speed reproduction.

Although the basic structure and operation of the present invention has been described above, the so-called multichannel-multisegment recording method is employed in a conventional digital VTR wherein data of one screen is divided into a plurality of tracks to be recorded using a plurality of heads, considering the great amount of information of digital video signals to be recorded. An embodiment will be described hereinafter where the present invention is applied to a digital VTR of a multichannel-multisegment recording method.

Figure 11:
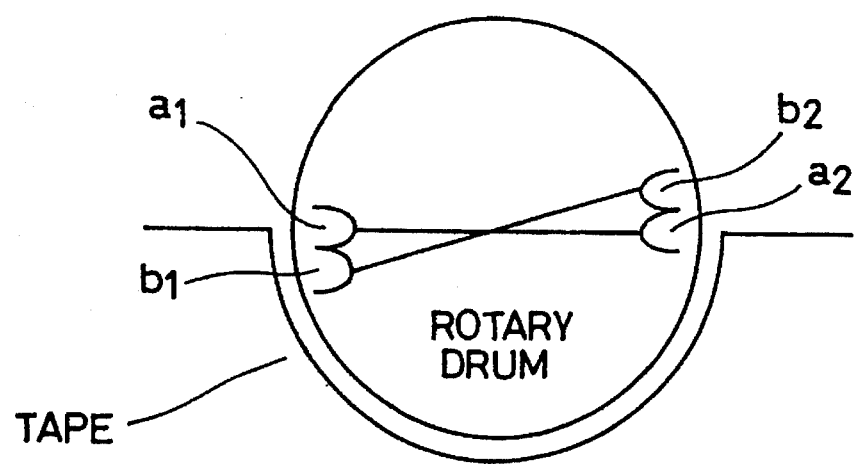
FIG. 11 schematically shows an example of an arrangement of heads used in a multichannel-multisegment recording method.

FIG. 11 schematically shows an example of an arrangement of heads used in a multichannel-multisegment recording method. In the following description, it is assumed that, for the sake of simplification, the four heads shown in FIG. 11 are used to divide digital video signal data of one screen into four tracks to be recorded.

Figure 12A:
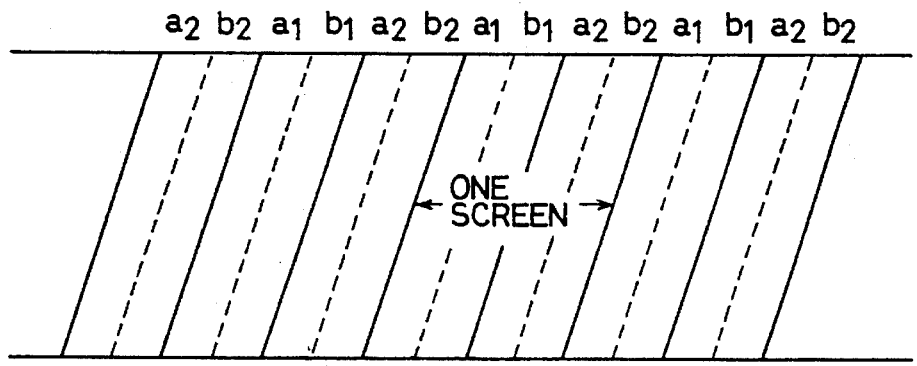
FIGS. 12A–12C schematically shows tracks formed by a digital VTR according to a multichannel-multisegment recording method.

Referring to FIG. 11, heads a1 and a2 are+azimuth heads, and heads b1 and b2 are–azimuth heads. With the pair of heads a1 and b1 and the pair of heads a2 and b2, video data of one screen is recorded on a tape using the two pairs, i.e. a total of four heads, for every rotation of the rotary drum of FIG. 11. FIG. 12A shows the case where data of one screen is recorded in four tracks using the four heads. Referring to FIG. 12A, the area indicated by a thick solid line shows the region where data of one screen is recorded, and the two regions defined by dividing such region into two by a thin solid line are regions respectively formed by the head pairs of a1 and b1, and a2 and b2. Each region defined by a dotted line corresponds to a track formed by each head.

The operations of error correction coding circuit 6 and rearranging circuit 7 of the recording system shown in FIG. 4 will be described hereinafter according to the present embodiment. As already described in association with FIG. 9B, error correction coding circuit 6 forms a plurality of error correction blocks (m blocks) to store recording blocks for each error correction blocks. In order to interleave tracks and error correction blocks with well balance, it is desirable to set the value of M such that the number of inner codes for each correction block and the number of inner codes of the recording blocks including the main components of the small blocks are a multiple of 4.

More specifically, it is assumed that the number of the inner codes is X and the number of the inner codes corresponding to the recording blocks including the main components of small blocks is Y for each correction block in case where the number of tracks is 4, for example, as in the case of embodiment. In order to carry out interleaving with well balance, that is, to equally distribute X inner codes included in each correction block into 4 tracks, the number X should be a multiple of 4 and, particularly in view of the necessity that the real data as well as the parity data should be equally distributed, the number Y should be a multiple of 4 as well.

Here, the description is provided assuming that the above conditions are satisfied when the number M of the error correction blocks is 4. In this case, as shown in FIG. 9B, respective error correction blocks have data arranged so that inner codes including the main components of small blocks adjacent on a screen are distributed onto separate error correction blocks.

Figure 12B:
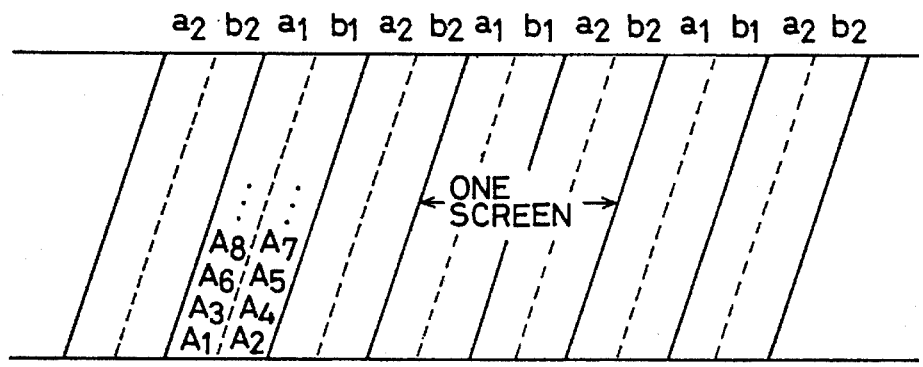

Although rearranging circuit 7 functions to arrange data so that inner codes including the main components of small blocks adjacent on a screen are adjacent even on tracks, the two tracks (the regions defined by a thin solid line and a thick solid line) formed by the head pairs of a1 and b1, or a2, and b2 are taken as one track, in which data is rearranged as in the arrangement shown in FIG. 12B in the present embodiment.

More specifically, rearranging circuit 7 carries out rearrangement of data so that inner codes including small blocks adjacent on a screen are alternately recorded on the pair of tracks in a sequence, such as block A1 to track a1, block A2 to track b1, block A3 to track a1, block A4 to track b1, block A5 to track b1, block A6 to track a1, block A7 to track b1, block A8 to track a1.

The reason why data is not simply distributed in the order of blocks A1, A3, A5, A7, . . . on track a1, but distributed in an exchanged sequence between blocks A1–A4 and blocks A5–A8 will be described hereinafter. If data is simply arranged in the order of A1, A3, A5, A7, . . . on track a1, a burst error when generated in the direction along the track can be distributed into only two error correction blocks, i.e. the first and third error correction blocks of FIG. 9B. If data is disposed in the order of block A1, A3, A6, A8, . . . on track a1, the burst error can be distributed into all the four error correction blocks of 1–4.

The invention may be implemented so that the order of arrangement is exchanged between blocks A1–A4 and blocks A5–A8 when error correction blocks are to be formed by error correction coding circuit 6, and then allocated to the pair of tracks as they are in rearranging data on the track by rearranging circuit 7.

Figure 12C:
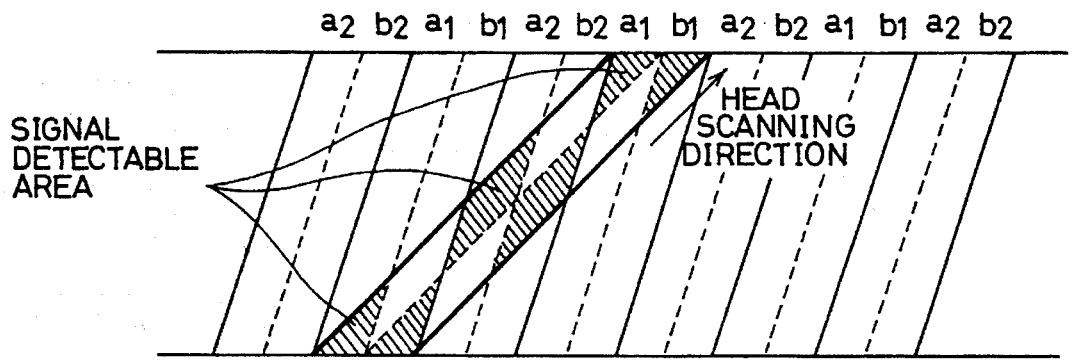

FIG. 12C schematically shows the relationship between record tracks on a tape formed as shown in FIG. 12B and the trace of a head pair (for example, head a1 and b1) at the time of high speed reproduction. Referring to FIG. 12C, the regions of tracks a1 and a2 and a1 (shaded area) scanned by head a1 to have recorded data detected, and the regions of different azimuth tracks b1 and b2 and b1 (shaded area) scanned by head b1 to have recorded data detected are located in substantially corresponding positions. As described in connection with FIG. 12B, by arranging small blocks adjacent on a screen to tracks forming a pair in an alternate manner and carrying out detection simultaneously with the above-described pair of heads, two times the number of small blocks can be reproduced successively, resulting in a double number of small blocks successively on a screen, in comparison with the case where recording blocks (inner codes) including the main components of small blocks adjacent on a screen are simply disposed adjacent on a single track to be detected by one head successively, as shown in FIGS. 9 and 10. By applying the present invention to a digital VTR of a multichannel-multisegment recording method shown in FIGS. 11 and 12, mosaic deformation of a screen can be more effectively avoided at the time of high speed reproduction to obtain a reproduced picture of a higher level of visual picture quality.

The present invention is applicable to the recording/reproduction method of tapes of various formats where a similar effect can be obtained by rearranging data according to that recording/reproduction method.

In the above-described embodiments, it is assumed that recording blocks and inner codes are in one-to-one correspondence. If the code length of each recording block is too long, one recording block can be divided to correspond to a plurality of inner codes taking into account the ability of error correction by inner codes. Conversely, if the code length of each recording block is too short and is disadvantageous from the standpoint of redundancy, a plurality of recording blocks including the main components of a plurality of small blocks adjacent on a screen can be combined to correspond to one inner code.

Although the above embodiments of the present invention has the screen divided into four as an example of obtaining a desired efficiency of bit rate reduction coding and a reproduced picture of high quality at the time of high speed reproduction, the present invention is not limited to this division of 4, and is applicable to a case where the screen is divided into another manner.

As already described in the section of the description of the background art, it was conventionally desirable to divide the entire screen into as many regions as possible from the standpoint of improving efficiency of bit rate reduction coding, while to divide the entire screen into a number of regions as few as possible from the standpoint of good visual picture quality of a reproduced picture at the time of high speed reproduction. Conventionally, the achievement of bit rate reduction coding and the achievement of a good visual picture quality of a high speed reproduced picture were evaluated integrally to determine design parameters of a digital VTR based on compromising points of both. By contrast, optimization of bit rate reduction coding and optimization of a high speed reproduced picture can be evaluated individually according to the present invention.

For example, considering the case where only the efficiency of bit rate reduction coding is to be improved while maintaining the quality of high speed reproduced picture where a screen is divided in 4, it is necessary to further reduce the deviation in the information amount to improve the efficiency of coding. This can be settled by increasing the divided number of the screen to increase the number of small blocks included in a fixed length block. Because the present invention has data arranged so that small blocks adjacent on a screen are also adjacent even on a track, the picture quality of a high speed reproduced picture can be maintained even in this case. That is to say, according to the present invention, a screen can be divided into an arbitrary number for achieving a desired efficiency of bit rate reduction coding independent of the picture quality of a high speed reproduced picture.

Although the above embodiment was described in which a video signal was not divided into a luminance signal and color difference signals, the main components of small blocks of luminance and color difference signals located correspondingly on a screen may be included in the same recording block in recording/reproducing a color television signal formed of a luminance signal and color difference signals.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An apparatus for recording digitally a supplied digital video signal, comprising:
    means for forming a plurality of small blocks, each including a plurality of pixels in the horizontal direction and the vertical direction of said digital video signal,
    means for forming a plurality of large blocks, each including a plurality of said small blocks located distant from each other on a screen,
    means for coding said digital video signal for each of said small blocks constituting said large block,
    means for controlling the code amount for each said large block so that the total code amount of the plurality of said small blocks constituting said large block is constant to form a fixed length block,
    means for dividing said fixed length block into a plurality of recording blocks so that respective main components of the plurality of said small blocks constituting said fixed length block are included separately in the plurality of recording blocks,
    means for rearranging said plurality of recording blocks so that recording blocks including the main components of small blocks adjacent to each other on a screen are also adjacent on a recording medium, and
    means for recording said rearranged plurality of recording blocks on said recording medium.

2. The digital recording apparatus according to claim 1, wherein said means for dividing said fixed length block includes means for storing first the main component of each small block into the corresponding recording block, where an average of the code length of the plurality of said small blocks constituting said fixed length block being defined as the code length of the recording block, and for storing the code which could not be stored in one recording block out of the code of a small block having a code length longer than the average code length into an empty area of another recording block in which another small block having a code length shorter than the average code length is stored.

3. An apparatus for reproducing digitally a recorded digital video signal, at the time of recording said digital video signal, a plurality of small blocks are formed each including a plurality of pixels in the horizontal direction and the vertical direction of a supplied digital signal to be recorded, a plurality of large blocks are formed each including a plurality of said small blocks located distant from each other on a screen, said digital video signal is coded for each of said small blocks constituting said large block, a fixed length block is formed by controlling the code amount for each said large block so that the total code amount of the plurality of said small blocks constituting said large block is constant, said fixed length block is divided into a plurality of recording blocks so that respective main components of the plurality of said small blocks constituting said fixed length block are included separately in the plurality of recording blocks, said plurality of recording blocks are rearranged on the basis of said recording block so that recording blocks including the main components of small blocks adjacent to each other on a screen are also adjacent on a recording medium, said rearranged plurality of recording blocks are recorded on said recording medium,
    said digital reproduction apparatus comprising:
        means for detecting a plurality of said recording blocks recorded on said recording medium,
        means for rearranging said detected recording blocks on the basis of said recording block to be in the original order prior to recording,
        means for reconstructing said fixed length block from the plurality of said recording blocks constituting said large block,
        means for decoding said digital video signal for each of the plurality of said small blocks constituting said reconstructed fixed length block, and
        means for rearranging the plurality of small blocks constituting said fixed length block to restore pixels corresponding to the digital video signal at the time of recording.

4. An apparatus for recording digitally a supplied digital video signal and for reproducing digitally a recorded digital video signal, comprising:
    means for forming a plurality of small blocks, each including a plurality of pixels in the horizontal direction and the vertical direction of said digital video signal,
    means for forming a plurality of large blocks, each including a plurality of said small blocks located distant from each other on a screen,
    means for coding said digital video signal for each of said small blocks constituting said large block,
    means for controlling the code amount for each said large block so that the total code amount of the plurality of said small blocks constituting said large block is constant to form a fixed length block,
    means for dividing said fixed length block into a plurality of recording blocks so that respective main components of the plurality of said small blocks constituting said fixed length block are included separately in the plurality of recording blocks,
    means for rearranging said plurality of recording blocks so that recording blocks including the main components of small blocks adjacent to each other on a screen are also adjacent on a recording medium,
    means for recording said rearranged plurality of recording blocks onto said recording medium,
    means for detecting said plurality of said recording blocks recorded on said recording medium,
    means for rearranging said detected recording blocks to be in the original order prior to recording,
    means for reconstructing said fixed length block from the plurality of said recording blocks constituting said large block,
    means for decoding said digital video signal for each of the plurality of said small blocks constituting said reconstructed fixed length block, and
    means for rearranging the plurality of small blocks constituting said fixed length block to restore pixels corresponding to the digital video signal at the time of recording.

5. The digital recording and reproduction apparatus according to claim 4, wherein said means for dividing said fixed length block includes means for storing first the main components of each small block into the corresponding recording block, where an average of the code length of the plurality of said small blocks constituting said fixed length block being defined as the code length of the recording block, and for storing the code which could not be stored in one recording block out of the code of a small block having a code length longer than the average code length into an empty area of another recording block in which a small block having a code length shorter than the average code length is stored.

6. An apparatus for recording digitally a video signal, comprising:

small blocking means for grouping a plurality of pixels for forming a plurality of small blocks;

coding means for coding said video signal for each small block;

large blocking means for grouping said plurality of small blocks obtained by said small blocking means for forming a plurality of large blocks;

means for constituting a fixed length block by controlling the amount of codes coded by said coding means to be constant for each large block;

means for dividing said fixed length block into a plurality of recording blocks; and recording block processing means for applying coding to said recording block to correct an error to be generated in reproduction and carrying out rearranging of the recording blocks for recording the rearranged recording blocks on a recording medium;

wherein said large blocking means forms each large block from a plurality of small blocks located apart from each other on a screen, said means for dividing said fixed length block carries out dividing so that components important to decode respective small blocks forming said large block are included in separate recording blocks, and said recording block processing means rearranges small blocks having their main components included in recording blocks adjacent on said recording medium, to be adjacent on said screen.

7. The digital recording apparatus according to claim 6, wherein said means for dividing said fixed length block includes means for storing first the main component of each small block into the corresponding recording block, where an average of the code length of the plurality of said small blocks constituting said fixed length block being defined as the code length of the recording block, and for storing the code which could not be stored in one recording block out of the code of a small block having a code length longer than the average code length into an empty area of another recording block in which another small block having a code length shorter than the average code length is stored.

8. An apparatus for reproducing digitally a video signal recorded by small blocking means for grouping a plurality of pixels for forming a plurality of small blocks; coding means for coding a video signal for each small block; large blocking means for grouping said plurality of small blocks obtained by said small blocking means for forming a plurality of large blocks; means for constituting a fixed length block by controlling the amount of codes coded by said coding means to be constant for each large block; means for dividing said fixed length block into a plurality of recording blocks; and recording block processing means for applying coding to said recording block to correct an error to be generated in reproduction and carrying out rearranging of the recording blocks for recording the rearranged recording blocks on a recording medium; wherein said large blocking means forms each large block from a plurality of small blocks located apart from each other on a screen, said means for dividing said fixed length block carries out dividing so that components important to decode respective small blocks forming a large block are included in separate recording blocks, and said recording block processing means rearranges small blocks, having their main components included in recording blocks adjacent on said recording medium, to be adjacent on a screen, said apparatus comprising:

recording block reproducing means for detecting a digital signal thus recorded on said recording medium and for correcting an error when such error has occurred in the reproduction and for rearranging the detected digital signal in the original order to obtain said recording block;

concealing means for reducing undesired effect to picture quality when an error could not be corrected by said recording block reproducing means;

means for reconstructing a fixed length block from a plurality of recording blocks forming said large block; and decoding means for decoding coded data in said fixed length block to obtain pixels in respective small blocks included in said fixed length block, wherein said concealing means carries out decoding by substituting a component which is not so important with a suitable value even if there is an error in a recording block including said component which is not so important when there is an error in said recording block including the main component of said small block.

9. The digital reproduction apparatus according to claim 8, wherein said concealing means includes means for substituting components other than said main components with a particular data, if there is no error in the portion of said recording block wherein the main components of a small block is included, and if there is an error in the portion of said recording block wherein components other than the main components of a small block is included.

10. An apparatus for recording and reproducing digitally a video signal, comprising:

small blocking means for grouping a plurality of pixels for forming a plurality of small blocks;

coding means for coding said video signal for each small blocks;

large blocking means for grouping said plurality of small blocks obtained by said small blocking means for forming a plurality of large blocks;

means for constituting a fixed length block by controlling the amount of codes coded by said coding means to be constant for each large block;

means for dividing said fixed length block into a plurality of recording blocks;

recording block processing means for applying coding to said recording block to correct an error to be generated in reproduction and carrying out rearranging of the recording blocks for recording the rearranged recording blocks on a recording medium;

wherein said large blocking means forms each large block from a plurality of small blocks located apart from each other on a screen, said means for dividing said fixed length block carries out dividing so that components important to decode respective small blocks forming said large block are included in separate recording blocks, and said recording block processing means rearranges small blocks, having their main components included in recording blocks adjacent on a recording medium, to be adjacent on said screen, recording block reproducing means for detecting a digital signal thus recorded on said recording medium and for correcting an error when such error has occurred in the reproduction and for rearranging the detected digital signal in the original order to obtain said recording block;

concealing means for reducing undesired effect to picture quality when an error could not be corrected by said recording block reproducing means;

means for reconstructing a fixed length block from a plurality of recording blocks forming said large block; and decoding means for decoding coded data in said fixed length block to obtain pixels in respective small blocks included in said fixed length block, wherein said concealing means carries out decoding by substituting a component which is not so important with a suitable value even if there is an error in a recording block including said component which is not so important when there is an error in a recording block including the main component of said small block.

11. The digital recording and reproduction apparatus according to claim 10, wherein said concealing means includes means for substituting components other than said main components with a particular data, if there is no error in the portion of said recording block wherein the main components of a small block are included, and if there is an error in the portion of said recording block wherein components other than the main components of a small block are included.

12. A method for recording digitally a supplied digital video signal, comprising the steps of:

(a) forming a plurality of small blocks, each including a plurality of pixels in the horizontal direction and the vertical direction of said digital video signal;

(b) forming a plurality of large blocks, each including a plurality of said small blocks located distant from each other on a screen;

(c) coding said digital video signal for each of said small blocks constituting said large block;

(d) controlling the code amount for each said large block so that the total code amount of the plurality of said small blocks constituting said large block is constant to form a fixed length block;

(e) dividing said fixed length block into a plurality of recording blocks so that respective main components of the plurality of said small blocks constituting said fixed length block are included separately in the plurality of recording blocks;

(f) rearranging said plurality of recording blocks so that recording blocks including the main components of small blocks adjacent to each other on a screen are also adjacent on a recording medium; and (g) recording said rearranged plurality of recording blocks on said recording medium.

13. A method for reproducing digitally a recorded digital video signal, at the time of recording said digital video signal, a plurality of small blocks are formed each including a plurality of pixels in the horizontal direction and the vertical direction of a supplied digital signal to be recorded, a plurality of large blocks are formed each including a plurality of said small blocks located distant from each other on a screen, said digital video signal is coded for each of said small blocks constituting said large block, a fixed length block is formed by controlling the code amount for each said large block so that the total code amount of the plurality of said small blocks constituting said large block is constant, said fixed length block is divided into a plurality of recording blocks so that respective main components of the plurality of said small blocks constituting said fixed length block are included separately in the plurality of recording blocks, said plurality of recording blocks are rearranged on the basis of said recording block so that recording blocks including the main components of small blocks adjacent to each other on a screen are also adjacent on a recording medium, said rearranged plurality of recording blocks are recorded on said recording medium, said digital reproduction method comprising the steps of:

(a) detecting a plurality of said recording blocks recorded on said recording medium, (b) rearranging said detected recording blocks on the basis of said recording block to be in the original order prior to recording, (c) reconstructing said fixed length block from the plurality of said recording blocks constituting said large block, (d) decoding said digital video signal for each of the plurality of said small blocks constituting said reconstructed fixed length block, and (e) rearranging the plurality of small blocks constituting said fixed length block to restore pixels corresponding said fixed length block to restore pixels corresponding to the digital video signal at the time of recording.

14. A method for recording digitally a supplied digital video signal and for reproducing digitally a recorded digital video signal, comprising the steps of:

(a) forming a plurality of small blocks, each including a plurality of pixels in the horizontal direction and the vertical direction of said digital video signal, (b) forming a plurality of large blocks, each including a plurality of said small blocks located distant from each other on a screen, (c) coding said digital video signal for each of said small blocks constituting said large block, (d) controlling the code amount for each said large block so that the total code amount of the plurality of said small blocks constituting said large block is constant to form a fixed length block, (e) dividing said fixed length block into a plurality of recording blocks so that the respective main components of the plurality of said small blocks constituting said fixed length block are included separately in the plurality of recording blocks, (f) rearranging said plurality of recording blocks so that recording blocks including the main components of small blocks adjacent to each other on a screen are also adjacent on a recording medium, (g) recording said rearranged plurality of recording blocks onto said recording medium, (h) detecting said plurality of said recording blocks recorded on said recording medium, (i) rearranging said detected recording blocks to be in the original order prior to recording, (j) reconstructing said fixed length block from the plurality of said recording blocks constituting said large block, (k) decoding said digital video signal for each of the plurality of said small blocks constituting said reconstructed fixed length block, and (l) rearranging the plurality of small blocks constituting said fixed length block to restore pixels corresponding to the digital video signal at the time of recording.

15. A method for recording digitally a video signal, comprising the steps of:

(a) grouping a plurality of pixels to form a plurality of small blocks;

(b) coding said video signal for each small block;

(c) grouping said plurality of small blocks to form a plurality of large blocks;

(d) constituting a fixed length block by controlling the amount of codes in step (b) to be constant for each large block;

(e) dividing said fixed length block into a plurality of recording blocks; and (f) applying coding to said recording block to correct an error to be generated in reproduction and carrying out rearranging of the recording blocks for recording the rearranged recording blocks on a recording medium;

wherein said step (c) forms each large block from a plurality of small blocks located apart from each other on a screen, said step (e) caries out dividing so that components important to decode respective small blocks forming said large block are included in separate recording blocks, and said step (f) rearranges small blocks, having their main components included in recording blocks adjacent on said recording medium, to be adjacent on said screen.

16. A method for reproducing digitally a video signal recorded by grouping a plurality of pixels for forming a plurality of small blocks; coding a video signal for each small block; grouping said plurality of small blocks for forming a plurality of large blocks; constituting a fixed length block by controlling the amount of codes coded by said coding step to be constant for each large block; dividing said fixed length block into a plurality of recording blocks; and applying coding to said recording block to correct an error to be generated in reproduction and rearranging of the recording blocks for recording the rearranged recording blocks on a recording medium; wherein said step of grouping said plurality of small blocks forms each large block from a plurality of small blocks located apart from each other on a screen, said step of dividing said fixed length block carries out dividing so that components important to decode respective small blocks forming a large block are included in separate recording blocks, and said step of rearranging rearranges small blocks, having their main components included in recording blocks adjacent on said recording medium, to be adjacent on a screen, said method comprising the steps of:

(a) detecting a digital signal thus recorded on said recording medium and correcting an error when such error has occurred in the reproduction and rearranging the detected digital signal in the original order to obtain said recording block;

(b) reducing undesired effect to picture quality when an error could not be corrected in step (a);

(c) reconstructing a fixed length block from a plurality of recording blocks forming said large block; and (d) decoding coded data in said fixed length block to obtain pixels in respective small blocks included in said fixed length block, wherein said step (b) carries out decoding by substituting a component which is not so important with a suitable value even if there is an error in a recording block including said component which is not so important when there is an error in said recording block including the main component of said small block.

17. A method for recording and reproducing digitally a video signal, comprising the steps of:

(a) grouping a plurality of pixels for forming a plurality of small blocks;

(b) coding said video signal for each small block;

(c) grouping said plurality of small blocks obtained by said small blocking means for forming a plurality of large blocks;

(d) constituting a fixed length by controlling the amount of codes coded in said step (b) to be constant for each large block;

(e) dividing said fixed length block into a plurality of recording blocks;

(f) applying coding to said recording block to correct an error to be generated in reproduction and carrying out rearranging of the recording blocks for recording the rearranged recording blocks on a recording medium;

wherein said step (c) forms each large block from a plurality of small blocks located apart from each other on a screen, said step (e) carries out dividing so that components important to decode respective small blocks forming said large block are included in separate recording blocks, and said step (f) rearranges small blocks, having their main components included in recording blocks adjacent on a recording medium, to be adjacent on said screen;

(g) detecting a digital signal thus recorded on said recording medium and correcting an error when such error has occurred in the reproduction and rearranging the detected digital signal in the original order to obtain said recording block;

(h) reducing undesired effect to picture quality when an error could not be corrected in step (g);

(i) reconstructing a fixed length block from a plurality of recording blocks forming said large block; and (j) decoding coded data in said fixed length block to obtain pixels in respective small blocks included in said fixed length block, wherein said step (h) carries out decoding by substituting a component which is not so important with a suitable value even if there is an error in a recording block including said component which is not so important when there is an error in a recording block including the main component of said small block.

* * * * *

UNITED STATES PATENT AND TRADEMARK OFFICE
CERTIFICATE OF CORRECTION

PATENT NO. : 5,473,479
DATED : December 5, 1995
INVENTOR(S) : Eiichi TAKAKURA

It is certified that error appears in the above-indentified patent and that said Letters Patent is hereby corrected as shown below:

On the title page item [*] Notice: The Portion of the term of this patent subsequent to January 15, 2013.

Signed and Sealed this

Sixteenth Day of April, 1996

Attest:

BRUCE LEHMAN

Attesting Officer

Commissioner of Patents and Trademarks